March 13, 1951   H. I. BECKER   2,545,335
BEARING LUBRICATION
Filed March 23, 1950
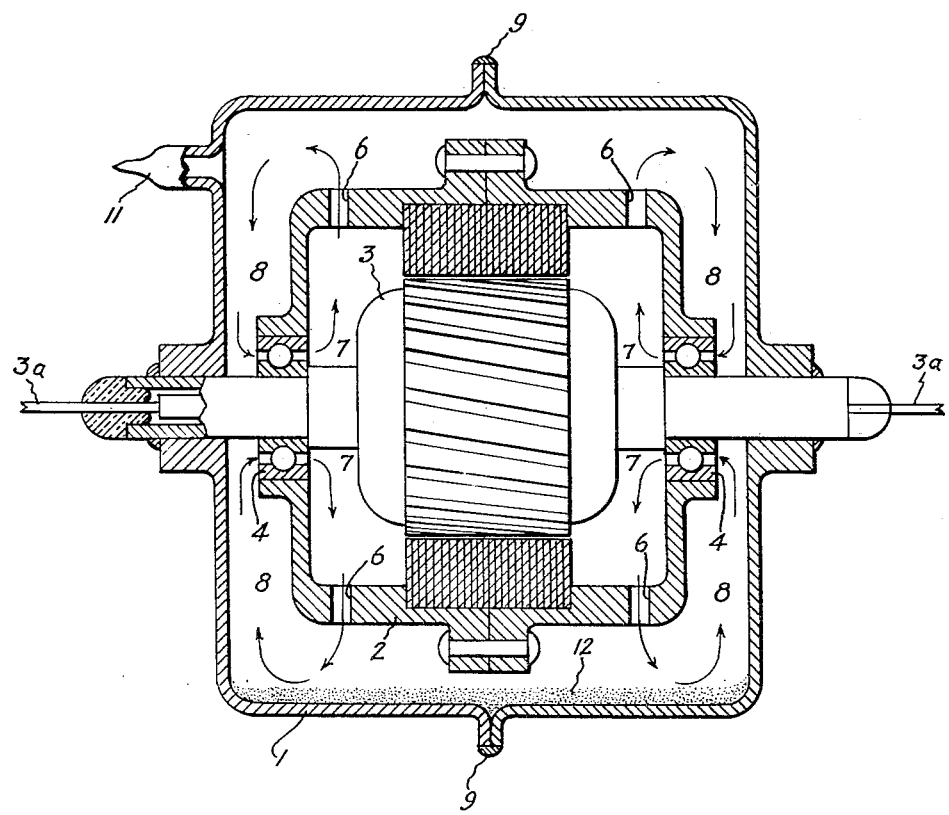
Inventor:
Howard I. Becker,
by Claude A. Mott
His Attorney.

UNITED STATES PATENT OFFICE 2,545,335

BEARING LUBRICATION

Howard I. Becker, Vischers Ferry, N. Y., assignor to General Electric Company, a corporation of New York Application March 23, 1950, Serial No. 151,339

1 Claim. (Cl. 171—252)

This invention relates to bearing lubrication and, in particular, to an improved arrangement for lubricating a bearing in a sealed container.

More particularly, this invention relates to that type of bearing lubrication application where oil could not be tolerated because of chemicals present, or because of a low temperature range.

It is an object of this invention to provide a new and improved lubrication arrangement for hermetically sealed rotating equipment.

It is a further object of this invention to provide a new and improved arrangement for lubricating hermetically sealed rotating equipment in an atmosphere where oil cannot be used.

Broadly, this invention comprises a structure wherein an accumulation of graphite powder is stored within a hermetically sealed housing. The graphite is picked up by air or gas circulation and lubricates bearings within the hermetically sealed housing.

Further objects and advantages of this invention will become apparent and the invention will be more clearly understood from the following description referring to the accompanying drawing, and the features of novelty which characterize this invention will be pointed out with particularity in the claim annexed to and forming a part of this specification.

Referring to the drawing, the single figure is a side view, partly in section, of a structure used to lubricate a hermetically sealed motor.

While, in the following description, reference is made to a motor producing a gyroscopic effect, it is to be understood that this type motor has been selected merely as an example to more clearly illustrate the purpose of this invention.

In the drawing, a hermetically sealed housing 1 is shown containing a revolving stator 2 and a stationary rotor 3. Stator 2 is supported by ball bearings 4 on rotor 3. Lead-in wires 3a are sealed in housing 1 and conduct power to the stationary rotor. The revolving stator gives a gyroscopic effect to the sealed housing 1.

Within the stator 2, radial openings 6 are provided to aid in the circulation of the cooling air or gas within the housing 1 and within the space enclosed by the stator.

It is to be understood that hermetically sealed motors have been found to operate without overheating, if air or an inert gas such as helium is used to cool the rotating elements.

In the particular embodiment shown, the rotation of stator 2 exhausts air through the radial openings 6 and lowers the pressure in the air spaces 7 that separate rotor 3 from stator 2. The pressure differential thus established forces air or gas from chamber 8 between stator 2 and housing 1 into the space enclosed by the stator. The air or gas passes from chambers 8 through bearings 4 into opening 7 and out through passageways 6 back to chamber 8, as indicated in the drawing by arrow 5. During rotation of stator 2, therefore, there is a continual circulation of the cooling air or gases within housing 1.

After stator 2, with its rotor 3, is installed in housing 1, a seam 9 is welded around the housing at a line where two halves of the housing are brought together. The weld tightly seals the housing 1. A seal-off 11 is provided at one point in housing 1 for evacuating the housing and charging it with a gas, if it is so desired.

A small mass of graphite powder 12 is put into housing 1 after the housing has been evacuated and charged with a cooling gas. It has been found that the circulating cooling gases pick up enough graphite powder particles to dust bearings 4 and keep them in operating condition for prolonged periods of time.

Modifications of this invention will occur to those skilled in the art and it is desired to be understood, therefore, that this invention is not to be limited to the particular embodiment disclosed, but that the appended claim is meant to cover all the modifications which are within the spirit and scope of this invention.

What I claim as new and desire to secure by Letters Patent of the United States is:

In combination, a motor having a stationary member and a rotating member substantially totally enclosing said stationary member, a pair of bearings mounted on said stationary member and supporting said rotating member for rotation, a hermetically sealed housing enclosing said motor and containing a cooling gas, passageways providing communication from the enclosed space within said rotating member to the space within said housing surrounding said rotating member to provide for circulation of said cooling gas from said space surrounding said rotating member through said bearings to said space within said rotating member and through said passageways to said space surrounding said rotating member in response to rotation of said rotating member, and a quantity of powdered graphite positioned within said housing in the path of circulation of said cooling gas to provide for convection of said graphite to the surfaces of said bearings to provide lubrication therefor during rotation of said rotating member.

HOWARD I. BECKER.

REFERENCES CITED

The following references are of record in the file of this patent:

UNITED STATES PATENTS

| Number | Name | Date |
| --- | --- | --- |
| 2,013,120 | Wellcome | Sept. 3, 1935 |
| 2,042,575 | Worth | June 2, 1936 |
| 2,084,479 | Coberly | June 22, 1937 |
| 2,413,285 | Bousky | Dec. 31, 1946 |